Reissued Feb. 10, 1942 Re. 22,021

UNITED STATES PATENT OFFICE 22,021

STEEL CONTAINING TELLURIUM

Morgan J. R. Morris, Massillon, Ohio, assignor to Republic Steel Corporation, Cleveland, Ohio, a corporation of New Jersey No Drawing. Original No. 2,236,716, dated April 1, 1941, Serial No. 353,891, August 23, 1940. Application for reissue November 5, 1941, Serial No. 417,942

2 Claims. (Cl. 75—123)

This invention relates to the art of making steel and is particularly concerned with a new and improved method of making fine grained, abnormal steels and with the resulting product.

Since about 1922 steels have been classified as "normal" or "abnormal," depending upon the extent to which the grains are surrounded by the grain boundary material, i. e., cementite after a definite carburizing operation is performed. When the grain boundary material is well defined and substantially continuous around each grain the steel is said to be normal, but when the grain boundary material is not substantially continuous the steel is said to be abnormal, and the degree of abnormality depends upon the extent to which the boundary material is interrupted. A steel is classified in the trade as normal or grade A steel when it has a substantially continuous boundary of cementite around each grain. Abnormal steels are classified in the trade (Dodge test) in grades B, C and D. In grade B the boundary material is slightly broken; in grade C it is considerably broken; and in grade D it is more or less limited to one or possibly two sides of the grain and has an appearance which is often referred to as "grape bunches".

For approximately the same length of time the steel industry has classified the sizes of grains in steel according to the standard chart of the American Society for Testing Materials. This chart extends from number 1 for very coarse grains to number 8 for very fine grains.

The present invention has to do particularly with abnormal steels which are classifiable in grades B, C or D (Dodge test) which have grains ranging in size between about #5 and about #8 on the A. S. T. M. standard scale, and which have compositions within the following ranges:

| | General range | Preferred range |
|---|---|---|
| | *Percent* | *Percent* |
| Iron | 99.27 to 90.44 | 98.96 to 94.37 |
| Carbon | .15 to 2.0 | .15 to 1.25 |
| Manganese | .30 to 3.0 | .50 to 1.5 |
| Molybdenum | .20 to 1.5 | .20 to .70 |
| Silicon | .15 to 2.5 | .15 to 2.0 |
| Sulphur | .01 to .4 | .02 to .06 |
| Phosphorus | .01 to .05 | .01 to .04 |
| Tellurium | .005 to .10 | .005 to .05 |

The Wills Patent No. 1,992,905, issued February 26, 1935, discloses steels of particular compositions and characteristics and also discloses a process for making these steels. The patent states that the abnormality is induced by conversion of the aluminum into alumina and the extreme dispersion of such alumina.

In making steels of the Wills type I have had considerable difficulty in controlling the grain size and abnormality of such steels by the use of aluminum. The retarding effect of the alumina on the solubility of the carbides seemed not to be consistent with the result that grain sizes and abnormalities of various heats varied considerably. I have obtained similar results with other retarders of the solubility of carbides. Moreover, none of these retarders produced the maximum desired degree of abnormality nor the desired resistance to coarsening of the core grains. In the steels of the Wills type the core grains exhibited tendencies to coarsen at temperatures well below about 1700° F.

The present invention provides a steel of the Wills type in which the abnormality and grain size may be controlled to a much greater extent than I have been able to control them heretofore. The abnormality of steels of the present invention may be more or less consistently maintained in the grade D (Dodge test) and are always classifiable at least in grade B. The grain sizes in the outer portions may be more or less consistently maintained at about #7 or #8 on the A. S. T. M. standard scale but all such grains are no larger than #5, and the core grains do not coarsen materially at temperatures materially below 1700° F.

Briefly stated, the present method includes the introduction of small amounts of tellurium into molten metal of the Wills type. Preferably the tellurium is added in the form of small pellets and may be added to the metal in the ladle or while the metal is being poured into ingot molds. The amount of tellurium added may vary within a fairly wide range, for example, from about 20 gms. (avoirdupois) to about two pounds per ton of steel. Satisfactory results have been obtained with about 25 gms. of tellurium per ton of steel and also with about one pound of tellurium per ton of steel. When the amounts of tellurium range from about 25 gms. to about one pound per ton of steel, their corresponding percentages are from about .005% to about .05%.

The present invention may be readily practiced by steel makers. Steel of the Wills type is made according to regular standard practice and as taught by the Wills patent, and the tellurium may be added as just described.

Articles made from such steels produced by the present method have substantially the same physical properties as those stated in the Wills patent with the additional property of high resistance to core grain coarsening at temperatures below about 1700° F.

Having thus described the present invention so that those skilled in the art may be able to understand and practice the same, I state that what I desire to secure by Letters Patent is defined in what is claimed.

What is claimed is:

1. An alloy steel having an abnormality of at least grade B (Dodge test), the grain size in the outer portions thereof being not larger than about #5 on the A. S. T. M. scale and having a core composed of grains which do not appreciably coarsen at temperatures below about 1700° F. said steel containing between about .15% and about 2.0% of carbon, between about .30% and about 3.00% of manganese, between about .15% and about 2.50% of silicon, between about .20% and about 1.5% of molybdenum, and between about .005% and about .10% of tellurium, the remainder being substantially all iron with small amounts of sulphur and phosphorus.

2. An alloy steel containing between about .6 to .7% of carbon, between about .7 to .9% of manganese, between about .2 to .3% of silicon, between about .2 to .3% of molybdenum, and between about .005 to .1% of tellurium, the remainder being substantially all iron with small amounts of sulphur and phosphorus.

MORGAN J. R. MORRIS.